US008404109B2

(12) United States Patent
Jansen et al.

(10) Patent No.: US 8,404,109 B2

(45) Date of Patent: Mar. 26, 2013

(54) SUCROSE INVERSION PROCESS

(75) Inventors: Robert Jansen, Portela (PT); John Kerr, South Croydon (GB); Anthony Baiada, Dagenham (GB)

(73) Assignee: European Sugar Holdings S.A.R.L., Luxembourg (LU)

( * ) Notice: Subject to any disclaimer, the term of this patent is extended or adjusted under 35 U.S.C. 154(b) by 0 days.

(21) Appl. No.: 13/316,278

(22) Filed: Dec. 9, 2011

(65) Prior Publication Data

US 2012/0138048 A1 Jun. 7, 2012

Related U.S. Application Data

(62) Division of application No. 12/025,153, filed on Feb. 4, 2008, now Pat. No. 8,092,609.

(60) Provisional application No. 60/888,176, filed on Feb. 5, 2007.

(51) Int. Cl.

*B01D 17/12* (2006.01)
*C13K 3/00* (2006.01)
*B01J 14/00* (2006.01)

(52) U.S. Cl. .................... 210/85; 127/1; 127/9; 210/94; 210/96.1; 210/143; 210/149; 422/105; 422/107; 422/109; 422/111; 700/32; 700/268; 700/271

(58) Field of Classification Search .................. 127/1, 9, 127/46.1, 46.2, 53, 55; 210/96.1, 143, 198.2, 210/511, 634, 656, 739, 661, 662, 85, 94, 210/149; 700/28, 32, 266, 268, 271, 273; 422/105, 107, 109, 111

See application file for complete search history.

(56) References Cited

U.S. PATENT DOCUMENTS

| | | | | | |
|---|---|---|---|---|---|
| 2,534,694 | A | * | 12/1950 | Blann | 127/41 |
| 2,813,810 | A | * | 11/1957 | Smith et al. | 127/55 |
| 2,917,520 | A | * | 12/1959 | Cope | 549/488 |
| 3,044,904 | A | * | 7/1962 | Serbia | 127/46.3 |
| 3,044,905 | A | * | 7/1962 | Lefevre | 127/46.3 |
| 3,290,173 | A | * | 12/1966 | Santino | 127/63 |
| 3,480,476 | A | | 11/1969 | Abbott | |

(Continued)

FOREIGN PATENT DOCUMENTS

| | | |
|---|---|---|
| FR | 2676235 | 11/1992 |
| GB | 1095210 | 12/1967 |

(Continued)

OTHER PUBLICATIONS

Lin et al., "Studies on the Production of Liquid Sugar," Taiwan Sugar Research Institute, TSC (Mar.-Apr. 1991).

(Continued)

*Primary Examiner* — Joseph Drodge

(74) *Attorney, Agent, or Firm* — Williams, Morgan & Amerson, P.C.

(57) ABSTRACT

A method of inverting sucrose, including (i) determining an initial solids concentration of an aqueous sucrose solution, an initial bed volume of a sucrose inversion resin system, a minimum target inversion percentage, a maximum target inversion percentage, a target maximum hydroxymethylfuran (HMF) concentration, a minimum target pH, or a maximum target pH; (ii) contacting the sucrose inversion resin system with the aqueous sucrose solution under conditions of aqueous solution flow rate and aqueous solution temperature to produce an inverted sucrose solution having an inversion percentage, an HMF concentration, and a pH; (iii) observing an instantaneous inversion percentage, an instantaneous HMF concentration, or an instantaneous pH of the inverted sucrose solution; and, if appropriate; (iv) changing at least one of the aqueous solution flow rate or the aqueous solution temperature to yield a product having a desired inversion percentage, HMF concentration, and/or pH. An apparatus capable of performing the method.

13 Claims, 2 Drawing Sheets

U.S. PATENT DOCUMENTS

| | | | | |
|---|---|---|---|---|
| 3,483,031 | A * | 12/1969 | Karl et al. | 127/41 |
| 3,632,446 | A | 1/1972 | Prince et al. | |
| 3,826,905 | A | 7/1974 | Valkama et al. | |
| 5,888,306 | A | 3/1999 | Durand et al. | |
| 5,944,905 | A | 8/1999 | Faugeras et al. | |
| 7,035,693 | B2 * | 4/2006 | Cassiolato et al. | 700/1 |
| 7,182,818 | B2 * | 2/2007 | Sanders | 127/52 |
| 7,433,743 | B2 * | 10/2008 | Pistikopoulos et al. | 700/52 |
| 8,092,609 | B2 * | 1/2012 | Jansen et al. | 127/41 |
| 2010/0063613 | A1 * | 3/2010 | Popp | 700/110 |

FOREIGN PATENT DOCUMENTS

| | | |
|---|---|---|
| JP | 9-308500 | 12/1997 |
| WO | 9745185 | 12/1997 |

OTHER PUBLICATIONS

Percival et al., "The Production of Liquid Invert Sugar with Ion Exchange Resins," Ion Exchange Resins, Rohm and Haas Company (date unknown).

PCT/US2008/052877 International Search Report (Dec. 29, 2008).

USPTO Office Action on U.S. Appl. No. 12/025,153, mailed Mar. 29, 2010.

USPTO Office Action on U.S. Appl. No. 12/025,153, mailed Mar. 30, 2011.

USPTO Office Action on U.S. Appl. No. 12/025,153, mailed Oct. 23, 2009.

* cited by examiner

SUCROSE INVERSION PROCESS

CROSS-REFERENCE TO RELATED APPLICATIONS

This application is a divisional of application Ser. No. 12/025,153, filed Feb. 4, 2008 now U.S. Pat. No. 8,092,609.

This application claims priority from U.S. provisional patent application Ser. No. 60/888,176, filed on Feb. 5, 2007, which is incorporated herein by reference.

BACKGROUND OF THE INVENTION

The present invention relates generally to the field of sugar processing. More particularly, it concerns an improved process for sucrose inversion.

Sucrose is a disaccharide of glucose and fructose and can be readily extracted from sugarcane (*Saccharum* spp.) and sugar beet (*Beta vulgaris*) to provide a nutritive sweetener for use in the production of soft drinks, candies, baked goods, and other foodstuffs for which sweetening is desired. For certain production processes, aqueous solutions of a sweetener such as sucrose are desired. However, aqueous solutions of sucrose used directly after extraction from sugarcane or sugar beet have a number of undesirable properties. First, the maximum sucrose concentration of an aqueous sucrose solution is only about 65 wt %, meaning for every 65 kg of sucrose, the solution contains about 35 kg of water. Attempting to concentrate sucrose to a greater extent leads to crystallization of the sucrose and concomitant difficulty in handling and processing. As can be readily seen, further concentration of the solids would allow a greater mass of solids to be transported per unit volume. Second, aqueous sucrose solutions directly after extraction may contain relatively high levels of ash (non-organic ions), which are generally undesirable for inclusion in sweet foodstuffs.

Sucrose inversion is the process of converting sucrose to its component saccharides, glucose and fructose. The term "inversion" comes from the observation that an aqueous solution containing free glucose and fructose, alone or in combination with residual sucrose, will have different optical properties relative to an aqueous solution containing only sucrose when exposed to polarized light. An aqueous solution containing sucrose, glucose, and fructose, which may be referred to herein as an "inverted sucrose solution," can be concentrated to a higher level than can an aqueous solution consisting essentially of sucrose; for example, at about 50% inversion, an inverted sucrose solution can be concentrated to about 75 wt % without crystallization. Depending on the inversion percentage, even higher concentrations are possible; for example, honey, which typically contains about 85 wt % total fructose and glucose on a dry solids basis (d.s.b.) and about 1 wt % sucrose d.s.b, also typically has a solids concentration of about 85 wt % without crystallization.

Known inversion techniques include the use of invertase enzyme, which is found in nature in bees, yeast, and bacteria, to catalyze the process, or the use of favorable conditions of pH and temperature, such as the addition of an acid to an aqueous sucrose solution and maintenance of the solution at an elevated temperature or contact of an aqueous sucrose solution with an appropriate ion exchange resin bed. At present, contact of an aqueous sucrose solution with an appropriate ion exchange resin bed is generally held to provide the most convenient and inexpensive technique for sucrose inversion, as it can both invert sucrose without the expense of purifying invertase enzyme and remove ash from the solution, in contrast to addition of an acid, which tends to add ash to the solution.

Although sucrose inversion by use of an ion exchange resin represents the current state of the art, room for improvement exists. The ion exchange resin's active sites are consumed during sucrose inversion, and although the active sites can be regenerated, regeneration requires the unit to go off-line and be treated with concentrated acid and base solutions, which require careful disposal. Also, a side reaction of sucrose inversion produces hydroxymethylfuran (HMF), a bitter-tasting molecule which is not desirable for inclusion in a material intended for use in a sweet foodstuff.

Therefore, it would be desirable to have improved techniques for sucrose inversion by use of an ion exchange resin.

SUMMARY OF THE INVENTION

In one embodiment, the present invention relates to a method of inverting sucrose, including:

(i) determining an initial solids concentration of an aqueous sucrose solution ($solids_i$), an initial bed volume ($BV_i$) of a sucrose inversion resin system, a minimum target inversion percentage ($invert\%_{min}$), a maximum target inversion percentage $invert\%_{max}$), a target maximum hydroxymethylfuran (HMF) concentration ($HMF_{max}$), a minimum target pH ($pH_{min}$), or a maximum target pH ($pH_{max}$);

(ii) contacting the sucrose inversion resin system with the aqueous sucrose solution under conditions of aqueous solution flow rate in $BV_i$/hr ($rate_p$) and aqueous solution temperature in ° C. ($temperature_p$) to produce an inverted sucrose solution having an inversion percentage (invert $\%_{product}$), an HMF concentration ($HMF_{product}$), and a pH ($pH_{product}$);

(iii) observing an instantaneous inversion percentage ($invert\%_{inst}$), an instantaneous HMF concentration ($HMF_{inst}$), or an instantaneous pH ($pH_{inst}$) of the inverted sucrose solution; and, if $invert\%_{inst}<invert\%_{min}$, $invert\%_{inst}>invert\%_{max}$, $HMF_{inst}>HMF_{max}$, $pH_{inst}<pH_{min}$, or $pH_{inst}>pH_{max}$;

(iv) changing at least one of the aqueous solution flow rate or the aqueous solution temperature such that $invert\%_{min}\leqq invert\%_{product}\leqq invert\%_{max}$, $HMF_{product}\leqq HMF_{max}$, or $pH_{min}\leqq pH_{product}\leqq pH_{max}$.

In another embodiment, the present invention relates to a computer readable program storage device encoded with instructions that, when executed by a computer, perform a method including:

(i) storing an initial solids concentration of an aqueous sucrose solution ($solids_i$), an initial bed volume ($BV_i$) of a sucrose inversion resin system, a minimum target inversion percentage ($invert\%_{min}$), a maximum target inversion percentage ($invert\%_{max}$), a target maximum hydroxymethylfuran (HMF) concentration ($HMF_{max}$), a minimum target pH ($pH_{min}$), or a maximum target pH ($pH_{max}$);

(ii) observing an instantaneous inversion percentage ($invert\%_{inst}$), an instantaneous HMF concentration ($HMF_{inst}$), or an instantaneous pH ($pH_{inst}$) of an inverted sucrose solution produced by contacting the sucrose inversion resin system with the aqueous sucrose solution under conditions of aqueous solution flow rate in $BV_i$/hr ($rate_p$) and aqueous solution temperature in ° C. ($temperature_p$); and, if $invert\%_{inst}<invert\%_{min}$, $invert\%_{inst}>invert\%_{max}$, $HMF_{inst}>HMF_{max}$, $pH_{inst}<pH_{min}$, or $pH_{inst}>pH_{max}$;

(iii) changing at least one of the aqueous solution flow rate or the aqueous solution temperature such that $invert\%_{min}\leqq invert\%_{product}\leqq invert\%_{max}$, $HMF_{product}\leqq HMF_{max}$, or $pH_{min}\leqq pH_{product}\leqq pH_{max}$.

In another embodiment, the present invention relates to an apparatus containing a controller comprising a processor, a storage device, and a bus system, wherein the processor and the storage device communicate through the bus system; at least one sensor in electronic communication with the controller, and at least one actuator in electronic communication with the controller, wherein the storage device is encoded with instructions that, when executed by the processor, perform a method including (i) storing an initial solids concentration of an aqueous sucrose solution ($solids_i$), an initial bed volume ($BV_i$) of a sucrose inversion resin system, a minimum target inversion percentage ($invert\%_{min}$), a maximum target inversion percentage ($invert\%_{max}$), a target maximum hydroxymethylfuran (HMF) concentration ($HMF_{max}$), a minimum target pH ($pH_{min}$), or a maximum target pH ($pH_{max}$);

(ii) observing an instantaneous inversion percentage ($invert\%_{inst}$), an instantaneous HMF concentration ($HMF_{inst}$), or an instantaneous pH ($pH_{inst}$) of an inverted sucrose solution produced by contacting the sucrose inversion resin system with the aqueous sucrose solution under conditions of aqueous solution flow rate in $BV_i$/hr $rate_p$) and aqueous solution temperature in ° C. ($temperature_p$); and, if $invert\%_{inst}<invert\%_{min}$, $invert\%_{inst}>invert\%_{max}$, $HMF_{inst}>HMF_{max}$, $pH_{inst}<pH_{min}$, or $pH_{inst}>pH_{max}$;

(iii) changing at least one of the aqueous solution flow rate or the aqueous solution temperature such that $invert\%_{min} \leqq invert\%_{product} \leqq invert\%_{max}$, $HMF_{product} \leqq HMF_{max}$, or $pH_{min} \leqq pH_{product} \leqq pH_{max}$.

Performing the method allows the efficient, readily controllable inversion of sucrose by use of ion exchange resins.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

DESCRIPTION OF ILLUSTRATIVE EMBODIMENTS

In one embodiment, the present invention relates to a method of inverting sucrose, comprising:

(i) determining an initial solids concentration of an aqueous sucrose solution ($solids_i$), an initial bed volume ($BV_i$) of a sucrose inversion resin system, a minimum target inversion percentage ($invert\%_{min}$), a maximum target inversion percentage ($invert\%_{max}$), a target maximum hydroxymethylfuran (HMF) concentration ($HMF_{max}$), a minimum target pH ($pH_{min}$), or a maximum target pH ($pH_{max}$);

(ii) contacting the sucrose inversion resin system with the aqueous sucrose solution under conditions of aqueous solution flow rate in $BV_i$/hr ($rate_p$) and aqueous solution temperature in ° C. ($temperature_p$) to produce an inverted sucrose solution having an inversion percentage ($invert\%_{product}$), an HMF concentration ($HMF_{product}$), and a pH ($pH_{product}$);

(iii) observing an instantaneous inversion percentage ($invert\%_{inst}$), an instantaneous HMF concentration ($HMF_{inst}$), or an instantaneous pH ($pH_{inst}$) of the inverted sucrose solution; and, if $invert\%_{inst}<invert\%_{min}$, $invert\%_{inst}>invert\%_{max}$, $HMF_{inst}>HMF_{max}$, $pH_{inst}<pH_{min}$, or $pH_{inst}>pH_{max}$;

(iv) changing at least one of the aqueous solution flow rate or the aqueous solution temperature such that $invert\%_{min} \leqq invert\%_{product} \leqq invert\%_{max}$, $HMF_{product} \leqq HMF_{max}$, or $pH_{min} \leqq pH_{product} \leqq pH_{max}$.

The word "or" is used herein in the inclusive sense unless a particular occurrence is expressly stated to be in the exclusive sense.

Figure 1:
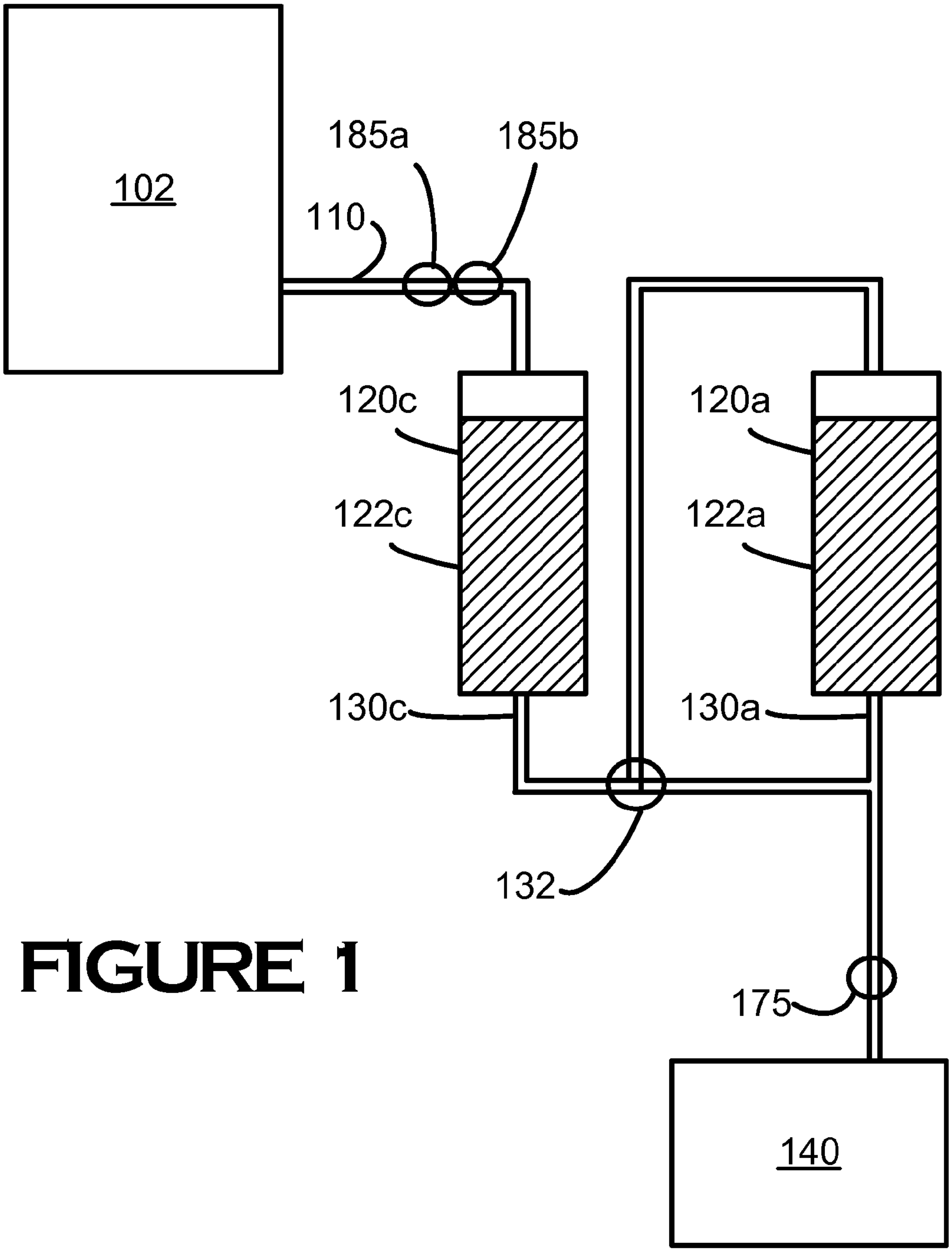
FIG. 1 shows an exemplary system for sucrose inversion.

An exemplary system 100 for performing sucrose inversion is shown in FIG. 1.

The sucrose in the aqueous sucrose solution can be derived from any source. At present, the most common sources of sucrose are the plants sugarcane and sugar beet, from which aqueous solutions of sucrose can be routinely derived by techniques known to the skilled artisan. An aqueous sucrose solution will generally also contain a small amount of ash, which is the term of art for non-organic ions. Ash generally is derived from non-organic ions present in the sucrose source and carried forward during processing. The storage and handling of the aqueous sucrose solution prior to performing the steps of the method described below is routine matter for the ordinary skilled artisan.

An aqueous sucrose solution to be used as a feedstock for the present method inherently has a number of properties that can be determined in the determining step. One such property is an initial solids concentration ($solids_i$), which typically is calculated on a wt solids/wt solution*100% basis. Alternatively, if the aqueous sucrose solution is substantially pure, the initial solids concentration can be approximated as being equal to the Brix value (° Bx) of the solution. ° Bx can be readily calculated either by saccharimetry, to derive the specific gravity of the solution, or by refractometry, to determine the refractive index of the solution with comparison to standard values of known sucrose solutions. Another such property is an initial ash concentration, which typically is calculated on a wt ash/wt total solids % basis. Immediately prior to contact with a sucrose inversion resin system, the aqueous sucrose solution will have a temperature, typically from about room temperature to about 60° C. The aqueous sucrose solution may have other properties known to the skilled artisan that can be determined in the determining step.

Sucrose inversion by ion exchange involves the use of sucrose inversion resins. "Resin," in this context, refers to a particulate mass known for use in chromatography, wherein the particles in the resin can be poured into a chromatography column, thereafter settling to form a bed through which a solution can flow and solute molecules within the solution can interact with active sites distributed through the resin particle bed. Generally, a sucrose inversion resin system for use herein has both a cation exchange resin bed and an anion exchange resin bed. In the cation exchange resin bed, a preponderance of ionic sites are acidic ($resin^-$-$H^+$), which may, when exposed to any ash that may be present in solution ($ash^+$ and $ash^-$ in the aqueous solution), lead to an exchange ($resin^-$-$ash^+$, and $H^+$ and $ash^-$ in the aqueous solution) that lowers the pH of the solution and enhances sucrose inversion in the aqueous solution. Alternatively or in addition, the acidic sites of the cation exchange resin may ionize in solution ($resin^-$ and $H^+$ in solution), which also lowers the pH of the solution and enhances sucrose inversion. Though not to be bound by theory, either or both cation exchange mechanisms may occur.

In the anion exchange resin bed, a preponderance of ionic sites are basic ($resin^+$-$OH^-$), and on contact with the aqueous solution containing $H^+$ and $ash^-$, hydroxyl ions are replaced with anionic ash, resulting in $resin^+$-$ash^-$ and $H^+$ and $OH^-$ in the aqueous solution, which yield water. As a result, not only is sucrose at least partially inverted by the sucrose inversion resin system, to yield an inverted sucrose solution (i.e., an aqueous solution containing at least fructose and glucose, and possibly containing sucrose), but also ash ions are removed, softening the inverted sucrose solution.

In one embodiment, the cation inversion resin is Amberlite FPC12H (Rohm and Haas, Philadelphia, Pa.).

The skilled artisan will understand that ionic sites of the resin beds are consumed by sucrose inversion. The ionic sites can be regenerated by the addition of strong acids or strong bases. However, regeneration cannot be performed during operation of the columns.

A further complication relating to sucrose inversion by ion exchange is that, under typical reaction conditions, a side-reaction can occur which leads to the production of hydroxymethylfuran (HMF). HMF is a bitter-tasting substance which, as can be readily comprehended, is not desirable to generate, as it will tend to make an inverted sugar solution bitter-tasting or require further processing to eliminate from an inverted sugar solution.

A sucrose inversion resin system to be used in the present method inherently has a number of properties that can be determined in the determining step. One such property is an initial bed volume ($BV_i$), which is the total volume of the resin beds formed after settling of cation exchange resin particles in a cation exchange chromatography column and anion exchange resin particles in an anion exchange chromatography column. The sucrose inversion resin system may have other properties known to the skilled artisan that can be determined in the determining step.

In contacting the aqueous sucrose solution with the sucrose inversion resin system, the skilled artisan will have a particular product in mind, and one or more desired properties of the product can be determined prior to contacting in order to guide the operator's efforts in performing the method. One such property of the product is a minimum target inversion percentage ($invert\%_{min}$), which is defined as the minimum acceptable weight percentage of fructose and glucose in the product over total product solids. Generally, an inversion percentage can be calculated by polarimetry, in which the solution's ability to rotate polarized light is measured and compared to standards of known inversion percentages. Another such property is a maximum target inversion percentage ($invert\%_{max}$). Another such property is a target maximum hydroxymethylfuran (HMF) concentration ($HMF_{max}$). The HMF concentration of an inverted sucrose solution can be determined by gas chromatography, among other techniques. Another such property is a minimum target pH ($pH_{min}$). Another such property is a maximum target pH ($pH_{max}$).

In the United States soft drink industry, typical desired product properties are $invert\%_{min}$, 50%; $invert\%_{max}$, 55%; $HMF_{max}$, 100 ppm; $pH_{min}$, 5.0; $pH_{max}$, 6.0. Desired product properties may vary from industry to industry and from country to country, depending on industrial requirements or cultural practices, among other factors.

Other product properties that can be determined include, but are not limited to, solids concentration, ash concentration, or color, among others.

In one embodiment, the determining step involves determining an initial solids concentration of an aqueous sucrose solution ($solids_i$), an initial bed volume ($BV_i$) of a sucrose inversion resin system, a minimum target inversion percentage ($invert\%_{min}$), a maximum target inversion percentage ($invert\%_{max}$), a target maximum hydroxymethylfuran (HMF) concentration ($HMF_{max}$), a minimum target pH ($pH_{min}$), or a maximum target pH ($pH_{max}$).

In the contacting step, the sucrose inversion resin system is contacted with the aqueous sucrose solution under conditions suitable for sucrose inversion to take place. As shown in the specific embodiment of FIG. 1, the aqueous sucrose solution can be housed in a tank 102 and fed, by pumping, gravity flow, or a combination via line 110 to a cation exchange resin column 120*c* containing a bed 122*c* of a cation exchange resin. The bed 122*c* can be prepared by known techniques, generally involving pouring a slurry containing the sucrose inversion resin and an aqueous, typically buffered, solution and allowing the resin to settle. Typical starting conditions for the contacting step include an aqueous solution flow rate through the sucrose inversion resin system ($rate_p$), generally measured in units of $BV_i$/hr, from about 0.1 $BV_i$/hr to about 10 $BV_i$/hr, where $BV_i$ is determined over total resin bed volumes, and an aqueous solution temperature from about 15° C. to about 75° C. The aqueous solution flow rate can be controlled by a flow control device 185*a*. The aqueous solution temperature can be controlled by a temperature control device 185*b*.

In one embodiment, the aqueous solution flow rate is between about 1 $BV_i$/hr and about 5 $BV_i$/hr. In a further embodiment, the aqueous solution flow rate is between about 2 $BV_i$/hr and about 4 $BV_i$/hr.

In one embodiment, the aqueous solution temperature is between about 30° C. and about 55° C. In a further embodiment, the aqueous solution temperature is between about 35° C. and about 45° C.

As the aqueous sucrose solution flows through the cation exchange resin column 120*c*, at least partial inversion of sucrose may occur, the pH is lowered, typically to about 3-4, and generally some amount of HMF is generated as a side product. Depending on the desired pH of the final product, some or all of the aqueous sucrose solution eluted from the cation exchange resin column 120*c* through line 130*c* is routed at valve 132 to an anion exchange resin column 120*a* containing an anion exchange resin bed 122*a*. In the anion exchange resin column 120*a*, at least partial inversion of sucrose may occur, the pH is raised, typically to about 7, and generally some amount of HMF is generated as a side product.

The result of the contacting step is an inverted sucrose solution having an inversion percentage ($invert\%_{product}$), an HMF concentration ($HMF_{product}$), and a pH ($pH_{product}$). The inverted sucrose solution may have other parameters, such as solids concentration, ash concentration, or color, among others. By routing only some of the eluted aqueous sucrose solution through the anion exchange resin column 120*a*, the overall pH of the inverted sucrose solution generated by mixing of cation-exchanged and cation- and anion-exchanged sucrose solutions can be brought to or close to a desired pH of the final product.

As the contacting step is performed, the aqueous sucrose solution will continually flow into the sucrose inversion resin system columns 120*c*, 120*a* and the inverted sucrose solution will continually elute from the columns 120*c*, 120*a* through output lines 130*c*, 130*a*. At any one or more desired times after the inverted sucrose solution begins to elute from the columns, an instantaneous inversion percentage ($invert\%_{inst}$), an instantaneous HMF concentration ($HMF_{inst}$), or an instantaneous pH ($pH_{inst}$) of the inverted sucrose solution can be observed by sampling from a port in line 130*c* and subsequent analysis of the sample, or by analyzing the inverted sucrose solution in line 130*c* in situ. Other instantaneous parameters of the inverted sucrose solution, including instantaneous solids concentration, instantaneous ash concentration or instantaneous color, among others, can also be observed. "Instantaneous" refers to the value observed from the quantity of the inverted sucrose solution that elutes from the column during a short sampling duration. In one embodiment, the short sampling duration can range from about 5 sec to about 15 min. The entire quantity of the inverted sucrose solution eluted from the columns during the short sampling duration can be used for observation of the instantaneous inversion percentage, the instantaneous HMF concentration, or the instantaneous pH, or an aliquot thereof can be used for these observations. In one embodiment, the instantaneous inversion percentage can be observed by performing polarimetric observation of the inverted sucrose solution using a polarimeter. This can be effected by the use of a polarimeter 175 in-line with the line 130*c* leading eluted inverted sucrose solution to downstream storage 140. Alternatively, the quantity or aliquot of the inverted sucrose solution can be taken away from the columns and analyzed at a different location in the plant or even off-site.

The observing step can be performed sporadically or on a regular schedule. In one embodiment, the observing step is performed on a regular schedule every 6, 8, 12, 16, 18, or 24 hr.

In one embodiment, the instantaneous inversion percentage ($invert\%_{inst}$), the instantaneous HMF concentration ($HMF_{inst}$), and the instantaneous pH ($pH_{inst}$) are observed. In another embodiment, one or more of $invert\%_{inst}$, $HMF_{inst}$, or $pH_{inst}$ can be calculated by observing the value reported from the sampling port and considering subsequent process steps to be performed, such as evaporation or pH adjustment, among others.

By performing the observing step, the operator can observe if one or more of the following relations are true:

$$invert\%_{inst} < invert\%_{min},$$

$$invert\%_{inst} > invert\%_{max},$$

$$HMF_{inst} > HMF_{max},$$

$$pH_{inst} < pH_{min}, \text{ or}$$

$$pH_{inst} > pH_{max}.$$

As the skilled artisan having the benefit of the present disclosure will be aware, if one or more of these relations hold, the properties of the inverted sucrose solution may be outside the parameters determined in the determining step, depending on whether the inversion percentage, HMF concentration, or pH is a product parameter of interest. In one embodiment, the operator observes if all of the relations are true.

In any embodiment, if one or more of these relations hold, the operator may perform a changing step, wherein at least one of the aqueous solution flow rate or the aqueous solution temperature is changed such that $$invert\%_{min} \leqq invert\%_{product} \leqq invert\%_{max},$$

$$HMF_{product} \leqq HMF_{max}, \text{ or}$$

$$pH_{min} \leqq pH_{product} \leqq pH_{max}.$$

In one embodiment, at least one of the aqueous solution flow rate or the aqueous solution temperature is changed such that $invert\%_{min} \leqq invert\%_{product} \leqq invert\%_{max}$, $HMF_{product} \leqq HMF_{max}$, and $pH_{min} \leqq pH_{product} \leqq pH_{max}$.

It may be the case that all the foregoing relations may be brought about by the changing step, regardless of whether one, some, or all the foregoing relations are desired properties of the product.

By changing the aqueous solution flow rate or aqueous solution temperature, the operator can also change the solids concentration, ash concentration, or color, among other properties, of the inverted sucrose solution.

In one embodiment, the changing step comprises changing the aqueous solution flow rate. The aqueous solution flow rate can typically be changed by adjusting the settings of a flow control device 185*a*, such as a flow control valve, a flow line pump, or the like, in line between the aqueous sucrose solution storage tank 102 and the inlet to the sucrose inversion resin system columns, such as cation exchange column 120*c*. Alternatively or in addition, the aqueous solution flow rate can be adjusted between the cation exchange column 120*c* and the anion exchange column 120*a*, such as by valve 132.

In one embodiment, the changing step comprises changing the aqueous solution temperature. The aqueous solution temperature can typically be changed by heating, turning off heating, chilling, or turning off chilling, any or all collectively represented by temperature control device 185*b* applied to the line 110 between the aqueous sucrose solution storage tank 102 and the inlet to the sucrose inversion resin system columns, such as cation exchange column 120*c*. Alternatively or in addition, the aqueous solution temperature can be adjusted between the cation exchange column 120*c* and the anion exchange column 120*a*.

In one embodiment, the changing step comprises changing the aqueous solution flow rate and changing the aqueous solution temperature.

The present inventors have discovered a number of qualitative relationships between changes in the aqueous solution flow rate, changes in the aqueous solution temperature, the product inversion percentage, and the product HMF concentration. In one embodiment, the aqueous solution flow rate is increased to decrease $invert\%_{product}$ or decrease $HMF_{product}$ or the aqueous solution flow rate is decreased to increase $invert\%_{product}$ or increase $HMF_{product}$. In another embodiment, the aqueous solution temperature is increased to increase $invert\%_{product}$ or increase $HMF_{product}$ or the aqueous solution temperature is decreased to decrease $invert\%_{product}$ or decrease $HMF_{product}$.

Also, the present inventors have discovered a number of quantitative relationships between changes in the aqueous solution flow rate, changes in the aqueous solution temperature, the product inversion percentage, and the product HMF concentration. These quantitative relationships allow the prediction of an instantaneous inversion percentage $invert\%_{inst,pred}$ or an HMF concentration ($HMF_{pred}$) from the aqueous solution flow rate ($rate_p$), the aqueous solution temperature ($temperature_p$), and the initial solids concentration of the aqueous sucrose solution ($solids_i$).

In one embodiment, a predicted instantaneous inversion percentage $invert\%_{inst,pred}$ can be predicted according to the equation:

$$invert\%_{inst,pred} = (w * rate_p) + (x * temperature_p) + (y * solids_i) + z,$$

wherein $rate_p$ has the units $BV_i$/hr, $temperature_p$ has the units ° C., $solids_i$ has the units wt solids/wt solution*100%, w has a value from about −1 to about −0.25, x has a value from about 0.01 to about 0.05, y has a value from about −0.04 to about −0.01, and z has a value from about 0.5 to about 2.5.

In one embodiment, a predicted HMF concentration ($HMF_{pred}$) can be predicted according to the equation:

$$HMF_{pred}=(a*temperature_p)+(b*rate_p)-c,$$

wherein a has a value from about 2 to about 12, b has a value from about −20 to about −5, and c has a value from about 75 to about 300.

In a further embodiment, the aqueous solution flow rate and the aqueous solution temperature are determined or changed to yield a predicted instantaneous inversion percentage $invert\%_{inst,pred}$ according to the equation:

$$invert\%_{inst,pred}=(-0.050*rate_p)+(0.023*temperature_p)+(-0.021*solids_i)+1.125,$$

wherein $$invert\%_{min}\leqq invert\%_{inst,pred}\leqq invert\%_{max},$$

or a predicted HMF concentration ($HMF_{pred}$) according to the equation:

$$HMF_{pred}=(5.7*temperature_p)+(-10.3571*rate_p)-158$$

wherein $$HMF_{pred}\leqq HMF_{max}.$$

In one embodiment, the aqueous solution flow rate and the aqueous solution temperature are determined or changed to yield both the predicted instantaneous inversion and the predicted HMF concentration according to the equations above.

By performing the changing step, the inversion percentage, the HMF concentration, or the pH of the inverted sucrose solution are controlled. In one embodiment, the inversion percentage, the HMF concentration, and the pH of the inverted sucrose solution are controlled. In another embodiment, other parameters of the inverted sucrose solution, such as solids concentration, ash concentration, or color, among others, are controlled.

After the changing step, the inverted sucrose solution can be handled or stored according to techniques well known in the art. For example, the inverted sucrose solution can be evaporated to increase the solids content of the solution prior to delivery of the solution to a customer.

Some portions of the detailed descriptions herein are presented in terms of a software-assisted process involving symbolic representations of operations on data bits within a memory in a computing system or a computing device. These descriptions and representations are the means used by those in the art to most effectively convey the substance of their work to others skilled in the art. In addition to manipulating compositions of matter, e.g., aqueous sucrose solutions, inverted sucrose solutions, and ion exchange resins, performed in the present method, the software-assisted aspects of the process and operation require physical manipulations of physical quantities. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated or otherwise as may be apparent, throughout the present disclosure, these descriptions refer to the action and processes of an electronic device, that manipulates and transforms data represented as physical (electronic, magnetic, or optical) quantities within some electronic device's storage into other data similarly represented as physical quantities within the storage, or in transmission or display devices. Exemplary of the terms denoting such a description are, without limitation, the terms "processing," "computing," "calculating," "determining," "displaying," and the like.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

In another embodiment, the present invention relates to a computer readable program storage device encoded with instructions that, when executed by a computer, perform a method, the method comprising:

(i) storing an initial solids concentration of an aqueous sucrose solution ($solids_i$), an initial bed volume ($BV_i$) of a sucrose inversion resin system, a minimum target inversion percentage ($invert\%_{min}$), a maximum target inversion percentage ($invert\%_{max}$), a target maximum hydroxymethylfuran (HMF) concentration ($HMF_{max}$), a minimum target pH ($pH_{min}$), or a maximum target pH ($pH_{max}$);

(ii) observing an instantaneous inversion percentage ($invert\%_{inst}$), an instantaneous HMF concentration ($HMF_{inst}$), or an instantaneous pH ($pH_{inst}$) of an inverted sucrose solution produced by contacting the sucrose inversion resin system with the aqueous sucrose solution under conditions of aqueous solution flow rate in $BV_i$/hr ($rate_p$) and aqueous solution temperature in ° C. ($temperature_p$); and, if $invert\%_{inst}<invert\%_{min}$, $invert\%_{inst}>invert\%_{max}$, $HMF_{inst}>HMF_{max}$, $pH_{inst}<pH_{min}$, or $pH_{inst}>pH_{max}$.

(iii) changing at least one of the aqueous solution flow rate or the aqueous solution temperature such that $invert\%_{min}\leqq invert\%_{product}\leqq invert\%_{max}$, $HMF_{product}\leqq HMF_{max}$, or $pH_{min}\leqq pH_{product}\leqq pH_{max}$.

Figure 2:
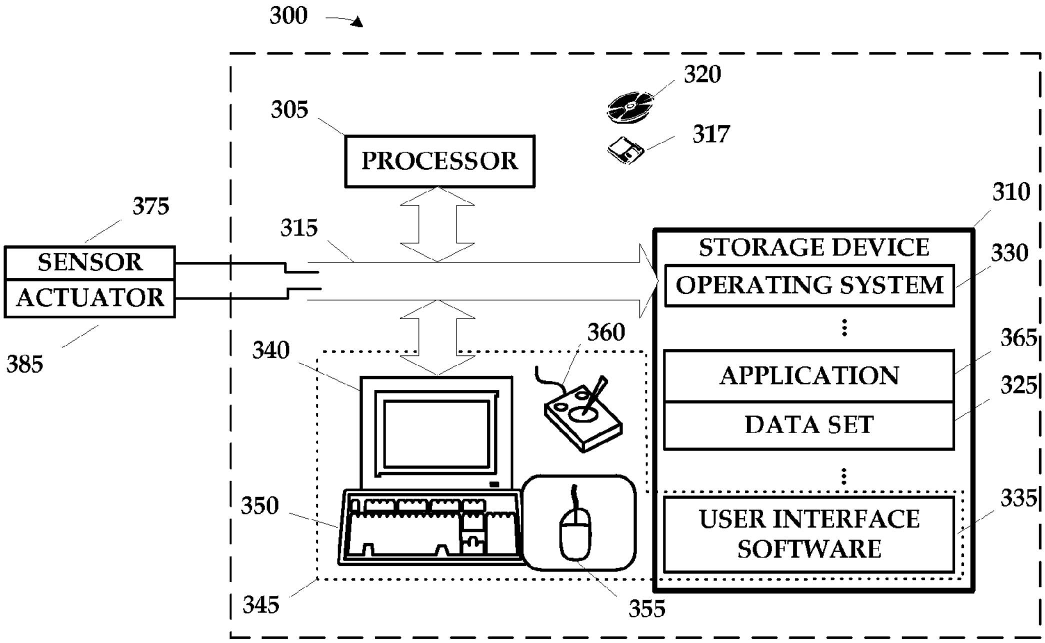
FIG. 2 shows selected portions of the hardware and software architecture of a computing apparatus such as may be employed in some aspects of the present invention.

Although not necessary to the practice of the invention, the process described herein will typically be performed under some kind of automated process control. FIG. 2 shows selected portions of the hardware and software architecture of a computing apparatus 300 such as may be employed in this manner in some aspects of the present invention. The computing apparatus 300 includes a processor 305 communicating with storage device 310 over a bus system 315. The storage device 310 may include a hard disk and/or random access memory ("RAM") and/or removable storage such as a floppy magnetic disk 317 and an optical disk 320.

The storage device 310 is encoded with a data set 325. The data set 325 contains elements including an initial solids concentration of an aqueous sucrose solution ($solids_i$), an initial bed volume ($BV_i$) of a sucrose inversion resin system, a minimum target inversion percentage ($invert\%_{max}$), a maximum target inversion percentage ($invert\%_{max}$), a target maximum hydroxymethylfuran (HMF) concentration ($HMF_{max}$), a minimum target pH ($pH_{min}$), or a maximum target pH ($pH_{max}$). The data set 325 may contain other elements of interest to the operator. Elements with the data set 325 can be acquired by operator input, by sensing various parameters, such as, for example, quantification of the amount of sucrose inversion resin system upon loading thereof onto a column, or by performing calculations on other elements.

Figure 3:
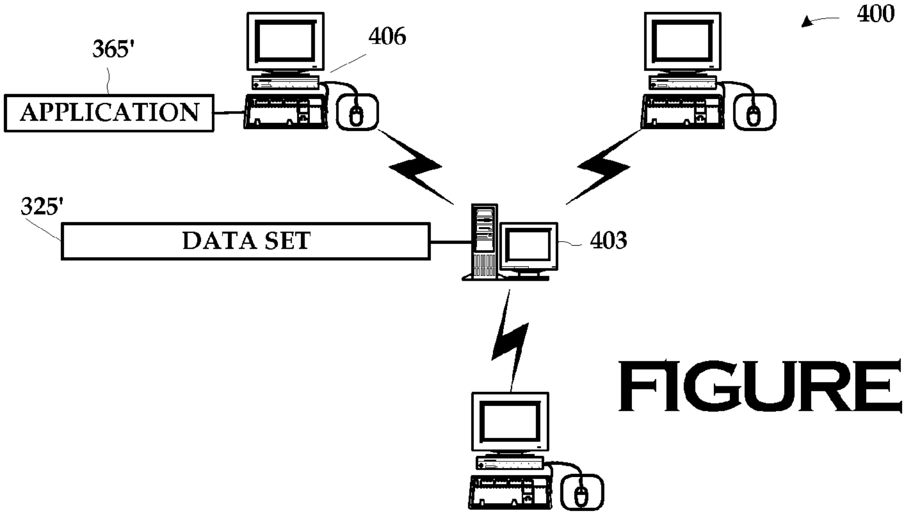
FIG. 3 illustrates a computing system on which some aspects of the present invention may be practiced in some embodiments.

Note that there is no need for the data set 325 to reside on the same computing apparatus 300 as the application 365 by which it is processed. Some embodiments of the present invention may therefore be implemented on a computing system, e.g., the computing system 400 in FIG. 3, comprising more than one computing apparatus. For example, the data set 325 may reside in a data structure residing on a server 403 and the application 365' by which it is processed on a workstation 406 where the computing system 400 employs a networked client/server architecture.

However, there is no requirement that the computing system 400 be networked. Alternative embodiments may employ, for instance, a peer-to-peer architecture or some hybrid of a peer-to-peer and client/server architecture. The size and geographic scope of the computing system 400 is not material to the practice of the invention. The size and scope of the computing system 400 may range anywhere from two machines of a Local Area Network ("LAN") located in the same room to many hundreds or thousands of machines globally distributed in an enterprise computing system.

Returning to FIG. 2, the storage device 310 is also encoded with an operating system 330, user interface software 335, and an application 365. The user interface software 335, in conjunction with a display 340, implements a user interface 345. The user interface 345 may include peripheral I/O devices such as a keypad or keyboard 350, a mouse or trackball 355, or a joystick 360. The processor 305 runs under the control of the operating system 330, which may be any operating system known to the art. The application 365 is invoked by the operating system 330 upon power up, reset, or both, depending on the implementation of the operating system 330. Note that the function of the application could be implemented in some other kind of software component, e.g., a utility, in alternative embodiments. The application 365, when invoked, assists the operator in performing the method of the present invention. The user may invoke the application 365 in conventional fashion through the user interface 345.

The computing apparatus 300 is in electronic communication with at least one sensor 375 and at least one actuator 385. The sensor 375 collects data which, when incorporated into the data set 325, is acted on by the application 365 during the observing step to observe the instantaneous inversion percentage ($invert\%_{inst}$), the instantaneous HMF concentration ($HMF_{inst}$), or the instantaneous pH ($pH_{inst}$) of the inverted sucrose solution eluted from the sucrose inversion resin system. Other instantaneous properties of the inverted sucrose solution, such as instantaneous solids concentration, instantaneous ash concentration, or instantaneous color, among others, can also be observed in the observing step. In one embodiment, the at least one sensor 375 is a polarimeter. In this embodiment, the data collected by the sensor 375 relates to the rotation of polarized light by the inverted sucrose solution and the application 365 can act on the data to observe the instantaneous inversion percentage ($invert\%_{inst}$) of the inverted sucrose solution.

If it is observed that $invert\%_{inst}<invert\%_{min}$, $invert\%_{inst}>invert\%_{max}$, $HMF_{inst}>HMF_{max}$, $pH_{inst}<pH_{min}$, or $pH_{inst}>pH_{max}$, then at least one of the aqueous solution flow rate and the aqueous solution temperature can be changed by communication from the application 365 to the at least one actuator 385. The changing step can be performed according to the description given above. In one embodiment, the at least one actuator 385 may be a flow control or and a temperature control device. When the at least one actuator 385 is a flow control device, the flow rate of the aqueous sucrose solution to the sucrose inversion resin system can be increased or decreased as desired within the broad mechanical limits of the system. When the at least one actuator 385 is a temperature control device, the temperature of the aqueous sucrose solution can be increased (such as by increasing the action of a heater or decreasing the action of a chiller) or decreased (such as by decreasing the action of a heater or increasing the action of a chiller) as desired within the broad mechanical limits of the system.

As will be appreciated by those skilled in the art having the benefit of this disclosure will appreciate, embodiments employing this type of automated process will control will usually control many aspects of the process. Most embodiments employing an automated process control will therefore usually receive data from a plurality of sources such as the sensor 375 and send command to a plurality of actuators 385. The number and function of the sensors 375 and actuators 385 controlled in any given embodiment will be implementation specific.

The following examples are included to demonstrate preferred embodiments of the invention. It should be appreciated by those of skill in the art that the techniques disclosed in the examples which follow represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

Example 1

A commercial-scale sucrose inversion system, having a total resin bed volume of 2.6 $m^3$, was modeled with an aqueous sucrose solution having known quantity and type of ash. Initial conditions were:

| Feed flow rate m3/hr | Feed flow BV/hr | Temp/C. |
|---|---|---|
| 8.9 | 3.5 | 38.00 |

After 7 hr, by performing calculations based on the above parameters, the known ash properties, and known resin properties, the activity remaining in the resin was calculated. Also, the mass and inversion percentage of the product were determined on a dry solids (DS) basis:

| Final flow rate on active resin BV/hr | Final active resin m3 | % active resin | Weight final product tonnes DS | Final step product cumulative % inversion |
|---|---|---|---|---|
| 4.79 | 1.86 | 73% | 48.1 | 53% |

At 7 hr, the feed flow rate and temperature were adjusted:

| Feed flow rate m3/hr | Feed flow BV/hr | Temp/C. |
|---|---|---|
| 5.2 | 2.0 | 36.00 |

At 14.4 hr total (7.4 hr after adjustment), resin activity was calculated and the mass and inversion percentage of the product were determined:

| Final flow rate on active resin BV/hr | Final active resin m3 | % active resin | Weight final product tonnes DS | Final step product cumulative % inversion |
|---|---|---|---|---|
| 3.57 | 1.44 | 56% | 36.2 | 53% |

Instantaneous values at particular timepoints were as follows:

| Step | Step time/hrs | Total run time/hrs | Instantaneous % inversion | BV/hr | Temp/° C. |
|---|---|---|---|---|---|
| 1 | 0 | 0 | 56.1 | 3.50 | 38 |
| 1 | 1 | 1 | 55.3 | 3.50 | 38 |
| 1 | 3 | 3 | 53.8 | 3.50 | 38 |
| 1 | 7 | 7 | 49.5 | 3.50 | 38 |
| 2 | 0 | 7 | 55 | 2.80 | 36 |
| 2 | 1 | 8 | 54.5 | 2.80 | 36 |
| 2 | 3 | 10 | 53.6 | 2.80 | 36 |
| 2 | 7.4 | 14.4 | 51.1 | 2.80 | 36 |

In summary, the model reported:

| Outputs | |
|---|---|
| Total run time/hr | 14.4 |
| Total DS product/tonnes | 84.3 |
| Total product @ 60DS/tonnes | 140.5 |
| Final % inversion of product mix | 53% |
| Invert produced per hour/tonnes DS | 5.85 |

Example 2

A commercial-scale sucrose inversion system, having a total resin bed volume of 2.55 $m^3$, was modeled with an aqueous sucrose solution having known quantity and type of ash. Initial conditions were:

| Feed flow rate m3/hr | Feed flow BV/hr | Temp/C. |
|---|---|---|
| 8.9 | 3.5 | 37.50 |

A total of four steps (initial conditions and three adjustments) were performed during the run, as follows:

| Step | Feed flow BV/hr | Temp/C. | Step time hr | Final flow rate on active resin BV/hr | Final active resin m3 | % active resin | Weight final product tonnes DS | Final step product cumulative % inversion |
|---|---|---|---|---|---|---|---|---|
| 1 | 3.5 | 37.50 | 4.3 | 4.19 | 2.13 | 84% | 29.6 | 53% |
| 2 | 2.1 | 35.00 | 4.3 | 2.84 | 1.88 | 74% | 17.7 | 53% |
| 3 | 1.1 | 32.50 | 5.9 | 1.65 | 1.71 | 67% | 12.8 | 53% |
| 4 | 0.3 | 30.25 | 6 | 0.52 | 1.66 | 65% | 4 | 53% |

Instantaneous inversion at various time points was measured:

| Step | Step time/hrs | Total run time/hrs | Instantaneous % inversion | BV/hr | Temp/° C. |
|---|---|---|---|---|---|
| 1 | 0 | 0 | 54.9 | 3.50 | 37.5 |
| 1 | 1 | 1 | 54.2 | 3.50 | 37.5 |
| 1 | 3 | 3 | 52.6 | 3.50 | 37.5 |
| 1 | 4.3 | 4.3 | 51.4 | 3.50 | 37.5 |
| 2 | 0 | 4.3 | 54.2 | 2.10 | 35 |
| 2 | 1 | 5.3 | 53.8 | 2.10 | 35 |
| 2 | 3 | 7.3 | 53.1 | 2.10 | 35 |
| 2 | 4.3 | 8.6 | 52.5 | 2.10 | 35 |
| 3 | 0 | 8.6 | 53.5 | 1.10 | 32.5 |
| 3 | 1 | 9.6 | 53.4 | 1.10 | 32.5 |
| 3 | 2 | 10.6 | 53.3 | 1.10 | 32.5 |
| 3 | 5.9 | 14.5 | 52.8 | 1.10 | 32.5 |
| 4 | 0 | 14.5 | 53.4 | 0.30 | 30.25 |
| 4 | 1 | 15.5 | 53.4 | 0.30 | 30.25 |
| 4 | 2 | 16.5 | 53.4 | 0.30 | 30.25 |
| 4 | 6 | 20.5 | 53.3 | 0.30 | 30.25 |

The modeling run was summarized as follows:

| Outputs | |
|---|---|
| Total run time/hr | 20.5 |
| Total DS product/tonnes | 64.1 |
| Total product @ 60DS/tonnes | 106.8 |
| Final % inversion of product mix | 53% |
| Invert produced per hour/tonnes DS | 3.13 |

Example 3

A commercial-scale sucrose inversion system, having a total resin bed volume of 2.55 $m^3$, was modeled with an aqueous sucrose solution having known quantity and type of ash. Initial conditions were:

| Feed flow rate m3/hr | Feed flow BV/hr | Temp/C. |
|---|---|---|
| 7.64 | 3 | 36 |

The feed flow was adjusted at various times during the run, but the temperature was held constant. A total of four steps (initial conditions and three adjustments) were performed during the run, as follows:

| Step | Feed flow % on initial | Feed flow BV/hr | Run time hr | Final flow rate on active resin BV/hr | Final active resin m3 | % active resin | Weight final product tonnes DS | Final step product cumulative % inversion |
|---|---|---|---|---|---|---|---|---|
| 1 | 100% | 3.00 | 4.3 | 3.5 | 2.19 | 86% | 25.4 | 53% |
| 2 | 86% | 2.58 | 4.3 | 3.5 | 1.88 | 74% | 24 | 53% |
| 3 | 73% | 2.20 | 4.8 | 3.5 | 1.61 | 63% | 20.9 | 53% |
| 4 | 63% | 1.88 | 4.8 | 3.5 | 1.38 | 54% | 17.9 | 53% |

The modeling run was summarized as follows:

| Outputs | |
|---|---|
| Total run time/hr | 18.2 |
| Total DS product/tonnes | 88.2 |
| Total product @ 60DS/tonnes | 147 |
| Final % inversion of product mix | 53% |
| Invert produced per hour/tonnes DS | 4.85 |

Example 4

Pilot Plant Sucrose Inversion

This process was run continuously over a period of about 17 hrs. A flow of sucrose syrup (109 lpm) with a DS of 67 and temperature of 75° C. was mixed with a soft water stream (18 lpm) to give a combined stream (127 lpm) with a target value of 60% DS. This combined stream was passed through a heat exchanger to reduce the temperature to 40° C. The cooled stream exiting the heat exchanger was passed through a cationic resin column. The cationic resin used was 2.5 $m^3$ of Rohm and Haas FPC12H. The column height was 1.4 m. The product stream from this column had a pH of 3. The inverted product was then passed through a splitter valve, the % opening of which was controlled from the feedback from a pH probe situated on the exit of the anionic resin column. The dimensions of the anionic column were the same as those of the cationic column. The anionic resin was Dowex Monosphere 66. The combined stream formed by combining the product leaving the anionic column and the bypass around the anionic columns had a targeted pH of about 4.5. The product was evaporated up to a target DS of 77.

Product streams from the cation and anion resins were analyzed for % inversion. The evaporated product was also analyzed for % inversion. The feed flow rate through the resin columns was increased or decreased to achieve the target % inversion. It is important to note that the product from the whole trial was combined in a mixing tank to achieve an overall target % inversion.

| Time | Run time | % Inversion Cation | % Inversion Anion | Anion pH | Evaporator outlet |
|---|---|---|---|---|---|
| 11:15:00 | 00:00:00 | 37.6 | 48.0 | 3.44 | 50 |
| 12:00:00 | 00:45:00 | 51.7 | 47.2 | 3.31 | 64 |
| 13:05:00 | 01:50:00 | 44.5 | 40.0 | 3.12 | 55 |
| 13:50:00 | 02:35:00 | 38.4 | 42.0 | 3.46 | 57 |
| 16:00:00 | 04:45:00 | 46.9 | 42.9 | 3.36 | 53 |
| 17:00:00 | 05:45:00 | 48.9 | 47.8 | 3.24 | 60 |
| 18:00:00 | 06:45:00 | 48.8 | 48.3 | 3.26 | 69 |
| 19:30:00 | 08:15:00 | 53.6 | 50.3 | 4.24 | 65 |
| 20:30:00 | 09:15:00 | 57.6 | 53.6 | 3.95 | 59 |
| 21:30:00 | 10:15:00 | 57.6 | 57.2 | 4.14 | 60 |
| 22:30:00 | 11:15:00 | 56.1 | 58.4 | 4.24 | 58 |
| 23:30:00 | 12:15:00 | 53.6 | 55.9 | 4.12 | 59 |
| 00:30:00 | 13:15:00 | 55.3 | 53.6 | 4.9 | 59 |
| 01:30:00 | 14:15:00 | 53.9 | 54.8 | 5.01 | 55 |
| 02:30:00 | 15:15:00 | 54.3 | 54.7 | 4.79 | 54 |
| 03:30:00 | 16:15:00 | 49.6 | 54.7 | 4.25 | 55 |

The table above illustrates that by adjusting the flow through the columns in a controlled way, it was possible to achieve the targeted cumulative % inversion.

All of the methods and apparatus disclosed and claimed herein can be made and executed without undue experimentation in light of the present disclosure. While the compositions and methods of this invention have been described in terms of preferred embodiments, it will be apparent to those of skill in the art that variations may be applied to the methods and apparatus and in the steps or in the sequence of steps of the methods described herein without departing from the concept, spirit and scope of the invention.

What is claimed is:

1. A computer readable program storage device encoded with instructions that, when executed by a computer, perform a method, the method comprising:

(i) storing an initial solids concentration of an aqueous sucrose solution ($solids_i$), an initial bed volume ($BV_i$) of a sucrose inversion resin system, a minimum target inversion percentage ($invert\%_{min}$), a maximum target inversion percentage ($invert\%_{max}$), a target maximum hydroxymethylfuran (HMF) concentration ($HMF_{max}$), a minimum target pH ($pH_{min}$), or a maximum target pH ($pH_{max}$);

(ii) observing an instantaneous inversion percentage ($invert\%_{inst}$), an instantaneous HMF concentration ($HMF_{inst}$), and an instantaneous pH ($pH_{inst}$) of an inverted sucrose solution produced by contacting the sucrose inversion resin system with the aqueous sucrose solution under conditions of aqueous solution flow rate in $BV_i$/hr ($rate_p$) and aqueous solution temperature in ° C. ($temperature_p$); and, if $$invert\%_{inst} < invert\%_{min},$$

$$invert\%_{inst} > invert\%_{max},$$

$$HMF_{inst} > HMF_{max},$$

$$pH_{inst} < pH_{min}, \text{ or}$$

$$pH_{inst} > pH_{max};$$

(iii) changing the aqueous solution flow rate, the aqueous solution temperature, or both of a second portion of the aqueous sucrose solution such that $$invert\%_{min} \leqq invert\%_{product} \leqq invert\%_{max},$$

$$HMF_{product} \leqq HMF_{max}, \text{ or}$$

$$pH_{min} \leqq pH_{product} \leqq pH_{max}.$$

2. The computer readable program storage device encoded with instructions that, when executed by a computer, perform the method of claim 1, wherein in the changing step of the method:

the aqueous solution flow rate is increased to decrease $invert\%_{product}$ or decrease $HMF_{product}$ or the aqueous solution flow rate is decreased to increase $invert\%_{product}$ or increase $HMF_{product}$; or the aqueous solution temperature is increased to increase $invert\%_{product}$ or increase $HMF_{product}$ or the aqueous solution temperature is decreased to decrease $invert\%_{product}$ or decrease $HMF_{product}$.

3. The computer readable program storage device encoded with instructions that, when executed by a computer, perform the method of claim 1, wherein the aqueous solution flow rate and the aqueous solution temperature are determined or changed to yield a predicted instantaneous inversion percentage $invert\%_{inst,pred}$ according to the equation:

$$invert\%_{inst,pred} = (-0.050 * rate_p) + (0.023 * temperature_p) + (-0.021 * solids_i) + 1.125,$$

wherein $$invert\%_{min} \leqq invert\%_{inst,pred} \leqq invert\%_{max},$$

or a predicted HMF concentration ($HMF_{pred}$) according to the equation:

$$HMF_{pred} = (5.7 * temperature_p) + (-10.3571 * rate_p) - 158$$

wherein $$HMF_{pred} \leqq HMF_{max}.$$

4. An apparatus, comprising:

a controller including:

a processor, a storage device, and a bus system over which the processor and the storage device communicate;

at least one sensor in electronic communication with the controller;

at least one actuator in electronic communication with the controller; and a software component residing on the storage device that, when executed by the processor, performs a method, the method comprising:

(i) storing an initial solids concentration of an aqueous sucrose solution ($solids_i$), an initial bed volume ($BV_i$) of a sucrose inversion resin system, a minimum target inversion percentage ($invert\%_{min}$), a maximum target inversion percentage ($invert\%_{max}$), a target maximum hydroxymethylfuran (HMF) concentration ($HMF_{max}$), a minimum target pH ($pH_{min}$), or a maximum target pH ($pH_{max}$);

(ii) observing from the at least one sensor an instantaneous inversion percentage ($invert\%_{inst}$), an instantaneous HMF concentration ($HMF_{inst}$), and an instantaneous pH ($pH_{inst}$) of an inverted sucrose solution produced by contacting the sucrose inversion resin system with the aqueous sucrose solution under conditions of aqueous solution flow rate in $BV_i$/hr ($rate_p$) and aqueous solution temperature in ° C. ($temperature_p$); and, if $$invert\%_{inst} < invert\%_{min},$$

$$invert\%_{inst} > invert\%_{max},$$

$$HMF_{inst} > HMF_{max},$$

$$pH_{inst} < pH_{min}, \text{ or}$$

$$pH_{inst} > pH_{max};$$

(iii) changing through the at least one actuator the aqueous solution flow rate, the aqueous solution temperature, or both of a second portion of the aqueous sucrose solution such that $$invert\%_{min} \leqq invert\%_{product} \leqq invert\%_{max},$$

$$HMF_{product} \leqq HMF_{max}, \text{ or}$$

$$pH_{min} \leqq pH_{product} \leqq pH_{max}.$$

5. The apparatus of claim 4, wherein in the changing step of the method:

the aqueous solution flow rate is increased to decrease $invert\%_{product}$ or decrease $HMF_{product}$ or the aqueous solution flow rate is decreased to increase $invert\%_{product}$ or increase $HMF_{product}$; or the aqueous solution temperature is increased to increase $invert\%_{product}$ or increase $HMF_{product}$ or the aqueous solution temperature is decreased to decrease $invert\%_{product}$ or decrease $HMF_{product}$.

6. The apparatus of claim 4, wherein in the method the aqueous solution flow rate and the aqueous solution temperature are determined or changed to yield a predicted instantaneous inversion percentage $invert\%_{inst,pred}$ according to the equation:

$$invert\%_{inst,pred} = (-0.050 * rate_p) + (0.023 * temperature_p) + (-0.021 * solids_i) + 1.125,$$

wherein $$invert\%_{min} \leqq invert\%_{inst,pred} \leqq invert\%_{max},$$

or a predicted HMF concentration ($HMF_{pred}$) according to the equation:

$$HMF_{pred} = (5.7 * temperature_p) + (-10.3571 * rate_p) - 158$$

wherein $$HMF_{pred} \leqq HMF_{max}.$$

7. The apparatus of claim 4, wherein the at least one sensor is a polarimeter.

8. The apparatus of claim 4, wherein the at least one actuator is a flow control or a temperature control device.

9. The apparatus of claim 4, wherein the software component comprises an application.

10. A computer readable program storage device encoded with instructions that, when executed by a computer, perform a method, the method comprising:

(i) storing an initial solids concentration of an aqueous sucrose solution ($solids_i$), an initial bed volume ($BV_i$) of a sucrose inversion resin system, a minimum target inversion percentage ($invert\%_{min}$), a maximum target inversion percentage ($invert\%_{max}$), a target maximum hydroxymethylfuran (HMF) concentration ($HMF_{max}$), a minimum target pH ($pH_{min}$), or a maximum target pH ($pH_{max}$);

(ii) calculating an instantaneous inversion percentage ($invert\%_{inst}$), an instantaneous HMF concentration ($HMF_{inst}$), and an instantaneous pH ($pH_{inst}$) of an inverted sucrose solution produced by contacting the sucrose inversion resin system with the aqueous sucrose solution under conditions of aqueous solution flow rate in $BV_i$/hr ($rate_p$) and aqueous solution temperature in ° C. ($temperature_p$); and, if $$invert\%_{inst} < invert\%_{min},$$

$$invert\%_{inst} > invert\%_{max},$$

$$HMF_{inst} > HMF_{max},$$

$$pH_{inst} < pH_{min}, \text{ or}$$

$$pH_{inst} > pH_{max};$$

(iii) changing the aqueous solution flow rate, the aqueous solution temperature, or both of a second portion of the aqueous sucrose solution such that $$invert\%_{min} \leqq invert\%_{product} \leqq invert\%_{max},$$

$$HMF_{product} \leqq HMF_{max}, \text{ or}$$

$$pH_{min} \leqq pH_{product} \leqq pH_{max}.$$

11. The computer readable program storage device encoded with instructions that, when executed by a computer, perform the method of claim 10, wherein the method further comprises requesting a sample of the inverted sucrose solution, and wherein the calculating is performed on the sample.

12. The computer readable program storage device encoded with instructions that, when executed by a computer, perform the method of claim 10, wherein in the changing step of the method:

the aqueous solution flow rate is increased to decrease $invert\%_{product}$ or decrease $HMF_{product}$ or the aqueous solution flow rate is decreased to increase $invert\%_{product}$, or increase $HMF_{product}$; or the aqueous solution temperature is increased to increase $invert\%_{product}$ or increase $HMF_{product}$ or the aqueous solution temperature is decreased to decrease $invert\%_{product}$ or decrease $HMF_{product}$.

13. The computer readable program storage device encoded with instructions that, when executed by a computer, perform the method of claim 10, wherein the aqueous solution flow rate and the aqueous solution temperature are determined or changed to yield a predicted instantaneous inversion percentage $invert\%_{inst,pred}$ according to the equation:

$$invert\%_{inst,pred} = (-0.050*rate_p) + (0.023*temperature_p) + (-0.021*solids_i) + 1.125,$$

wherein $$invert\%_{min} \leqq invert\%_{inst,pred} \leqq invert\%_{max},$$

or a predicted HMF concentration ($HMF_{pred}$) according to the equation:

$$HMF_{pred} = (5.7*temperature_p) + (-10.3571*rate_p) - 158$$

wherein $$HMF_{pred} \leqq HMF_{max}.$$

* * * * *